United States Patent [19]

Huber

[11] Patent Number: 5,433,550
[45] Date of Patent: Jul. 18, 1995

[54] CONNECTING DEVICE FOR QUICKLY AND RELEASABLY INTERCONNECTING TWO BODIES

[75] Inventor: Thomas Huber, Iffeldorf, Germany

[73] Assignee: Barvaria Cargo Technologie GmbH, Munich, Germany

[21] Appl. No.: 62,195

[22] Filed: May 17, 1993

[30] Foreign Application Priority Data

May 18, 1992 [DE] Germany ............... 42 16 413.3

[51] Int. Cl.⁶ ..................................... F16B 1/00
[52] U.S. Cl. ..................................... 403/348; 403/321; 403/325; 403/388; 410/105; 74/287; 74/593; 74/697.1
[58] Field of Search ............... 403/321, 322, 323, 325, 403/348, 384, 388; 410/104, 105, 82, 83; 24/287, 593, 596, 697.1; 198/465.1, 803.01; 244/118.1, 118.6; 248/503

[56] References Cited

U.S. PATENT DOCUMENTS

| 3,241,501 | 3/1966 | Watts | 410/105 |
| 4,108,081 | 8/1978 | Blanz | 410/82 |
| 4,125,077 | 11/1978 | Baasco | 410/82 |
| 4,212,560 | 7/1980 | Pufpaff et al. | 403/388 |
| 5,002,418 | 3/1991 | McLown et al. | 410/82 |
| 5,160,224 | 11/1992 | Schwiebert | 410/82 |

FOREIGN PATENT DOCUMENTS 985684 3/1965 United Kingdom .
1334336 10/1973 United Kingdom .
1494729 12/1977 United Kingdom ............... 410/82
1214511 2/1986 U.S.S.R. ............................. 410/82

Primary Examiner—Richard A. Bertsch
Assistant Examiner—William J. Wicker
Attorney, Agent, or Firm—Howard & Howard

[57] ABSTRACT

A connecting device for releasably interconnecting first and second bodies includes a housing which can be applied to a holding means, and a locking pin having a locking head which can be turned to and fro between a starting position in which the locking head can be introduced into a receiving opening in the holding means and a locking position in which the locking head engages under a support portion formed by edge regions of the receiving opening. A stressing spring arrangement is operable to urge the locking pin from an axially advanced position in the starting position of the device into an axially withdrawn position in the locking position, in which the pressure contact surface of the locking head is pressed by the spring arrangement against the support portion of the holding means. The housing has a guide surface against which a running surface of the locking pin is pressed, with increasing stressing of the spring arrangement, in the transition from the starting position into the locking position, without the pressure contact surface of the locking head initially contacting the support portion against which it is pressed only at the end of the rotary movement.

10 Claims, 2 Drawing Sheets

CONNECTING DEVICE FOR QUICKLY AND RELEASABLY INTERCONNECTING TWO BODIES

BACKGROUND OF THE INVENTION

The invention concerns a connecting device for quick, releasable connection and locking of a first body to a second body, for example a freight component to a support rail or bar which is fixedly installed in an aircraft.

The usual practice is for freight containers or pallets to be anchored to the floor of the freight compartment in an aircraft by means of locking arrangements including connecting devices which are quick to close and open and by means of which the freight containers or pallets can be fitted into holding components such as support rails or bars which are let into the floor of the freight compartment, and there anchored in position by a locking action. For reasons, of saving weight, the support bars generally consist of aluminum, while at least the parts of the connecting devices which are fixedly connected to the locking arrangements and which under some circumstances are required to carry high forces are made from materials which can appropriately carry the loadings involved, for example high-quality steel.

Although the above-discussed situation represents a preferred area of use of the connecting device according to the present invention, it will be noted at this point that connecting devices constructed in accordance with the invention can be used wherever first and second bodies are to be connected and locked together in a similar fashion to that described above. It will be seen that, in that respect, the only important consideration is that one of the two bodies is fixedly connected to the housing of the connecting device at least during the period of use while the other body has a holding means, which corresponds to the above-mentioned support bar, having a receiving opening into which a head portion of a locking pin of the connecting device can be introduced in an initial position, and against the edge regions of which that head portion can bear in locking relationship in a direction which is generally opposite to the direction of introduction, when the head portion, after having been introduced, has been turned through a given angle, for example 90°.

In order for a connecting device to operate in a situation as just discussed above, the known connecting device has a housing in which a locking pin is mounted in such a way that, besides the above-mentioned rotary movement, it can also perform a controlled axial movement. For that purpose the locking pin is provided at its end remote from the locking head with a two-armed lever which is pivotable about a shaft or spindle mounted on the locking pin and extending transversely to the longitudinal axis thereof. The one arm of the lever, which is longer than the other arm, is in the form of a handle while the other substantially shorter arm forms a cam disk portion acting with its peripheral edge on a disk portion which is arranged perpendicularly to the longitudinal axis of the locking pin and concentrically surrounds same. The last-mentioned disk portion is freely displaceable relative to the locking pin at least in the axial direction and bears against the housing by way of plate springs, on the side of the disk portion which is remote from the cam disk portion.

In that arrangement the two-armed lever can be pivoted from a first position in which the handle extends approximately in the longitudinal direction of the locking pin, into a second position in which the handle is disposed at an angle of 90° relative to the longitudinal axis of the locking pin. The peripheral edge of the cam disk portion is such that its part which acts on the transversely disposed disk portion is at a smaller position from the pivot axis, in the first position, than that part which acts on the transversely disposed disk portion in the second position. By virtue of that arrangement, the spacing between the transversely disposed disk portion and the pivot axis is increased by the pivotal movement of the two-armed lever into the second position in which the handle is at an angle of 90° relative to the longitudinal axis of the locking pin. As the transversely disposed disk portion cannot in practice move downwardly against the force of the plate springs supporting it, instead the pivot axis and the locking pin, which is rigidly connected thereto, must move in the opposite direction upwardly, that is to say, in such a way that its locking head, which is disposed at the other end of the locking pin is pressed by way of two projecting flange regions against a support portion of the support bar.

That device is actuated in such a way that firstly, when the handle is set in the up position, the locking pin is rotated about its longitudinal axis into such a position that its locking head, which is of a radially asymmetrical configuration, can be introduced through a suitably shaped receiving opening in the support bar. The locking pin is then turned through 90° in such a way that, as described above, its locking head engages against edge regions of the receiving opening and can therefore no longer come out of that opening, in the opposite direction to the direction of introduction. Then, with the arrangement in that condition, the handle is pivoted into its second position in order to move the locking pin in the opposite direction to the direction of introduction, whereby the locking head is pressed against the support portion of the support bar, and the above-mentioned plate springs are tightened.

That arrangement suffers from the disadvantage that, both when the connection is being made between the two bodies and when such a connection is being released, the operator is required to perform two different movements, namely a rotary movement of the locking pin about its longitudinal axis and a pivotal movement of the two-armed lever about the pivot axis which extends transversely to the longitudinal axis of the locking pin. A particular disadvantage in that respect is that only an extremely short lever arm is available for performing the first-mentioned rotary movement about the longitudinal axis of the locking pin, as that rotary movement is effected when the handle portion of the two-armed lever is extending in the longitudinal direction of the locking pin. The operator will therefore tend already to pivot the two-armed lever downwardly through a certain angle during the rotary movement of the locking pin so that the rotary movement can be more easily performed. However, that pivotal movement of the lever means that the locking pin is already drawn upwardly in the opposite direction to the direction of introduction thereof, so that there is the risk that, during the rotary movement involving going from the starting position into the locking position, the locking pin skids along with the upward surfaces of its locking head against the underside of the edge regions of the receiving opening in the support bar, the edge regions forming the support portion against which the locking head bears. A corresponding consideration also applies in regard to the oppositely directed rotary movement out of the locking position into the initial position of the arrangement, when releasing the connecting device. As the locking pin with its head is made from material which can carry high loadings, such as for example high-quality steel, the above-indicated phenomena can result in very severe abrasive wear at the underneath surfaces of the edge regions of the receiving opening of the support bar which is of aluminium.

SUMMARY OF THE INVENTION

An object of the present invention is to provide a connecting device for quick releasable connection and locking of a first body to a second body, which device is of a simple design configuration and simple to operate and which minimises abrasive wear at an opening accommodating a locking pin of the connecting device.

Another object of the present invention is to provide a connecting device for locking a freight component to a support bar by employing simple movements while guaranteeing a secure locking action.

Still another object of the present invention is to provide a connecting device for locking a first body and a second body together, which device is of a simple construction involving a small number of mutually moving components and which affords the operator of the device an improved feel for the proper operating movements of the device.

In accordance with the present invention the foregoing and other objects are achieved by a connecting device which, for quick and releasable connection and locking of a first body to a second body, for example a freight component such as a container to a support rail or bar installed in an aircraft, includes a housing which in use is connected to one of the bodies and which in a connecting or operative position of the device bears against a holding means on the second body. The holding means has a receiving opening with an edge region. The connecting device further includes at least one locking pin which has a locking head providing a pressure contact surface and which is mounted in the housing rotatably about its longitudinal axis such that it can be rotationally reciprocated between a starting position, in which the locking head can be introduced into the receiving opening in the holding means and is movable out of the receiving opening, and a locking position in which the locking head engages the edge region of the receiving opening. A stressing means is operable to move the locking pin out of an axially advanced condition, in which it is in the starting position thereof, into an axially retracted condition in which the pressure contact surface of the locking head is pressed in the locking position against a support portion of the holding means by a stressed spring, which support portion is disposed within the receiving opening adjoining the edge region against which the locking head engages. Provided on the housing is a guide surface against which a running surface of the locking pin is pressed during a rotary movement from the starting position into the locking position, with increasing stressing of the spring, without the pressure contact surface of the locking head coming into contact with the support portion. It is only in the last part of that rotary movement that the running surface comes free from the guide surface so that the force of the stressed spring presses the pressure contact surface against the support portion.

As will be seen in further detail hereinafter with reference to a preferred embodiment of the invention, the above-defined arrangement ensures that the operator only has to turn the locking pin about its longitudinal axis. When that happens, the locking pin, by virtue of its running surface bearing against the guide surface of the housing, is positively guided in the axial direction in such a way that the contact pressure surface of its locking head cannot come into contact with the holding means, and in particular the support surfaces thereof, during the major part of the rotary movement of the locking pin. At the same time, as that rotary movement takes place, the spring arrangement, whose force causes the locking pin to be pressed with its pressure contact surface against the support portion, of the holding means in the locking position is continuously stressed. It is only over the last degrees of angle of the rotary movement that the running surface of the locking pin comes free from the guide surface of the housing so that the positive axial guidance action afforded by the co-operation of those two surfaces is terminated. Thus the locking pin can move under the force of the spring, axially loading same, and it is pressed with the pressure contact surface of the locking head against the support portion of the holding means. The stroke movement of the locking pin which takes place in that situation can be extremely small, for example of the order of magnitude of some hundredths of a millimeter. The only important consideration is that, during virtually the entire rotary movement of the locking pin, with the exception only of the last degrees of angle referred to above, there is no wearing contact between the hard pressure contact surface of the locking pin and the substantially softer support portion of the holding means.

In the opposite direction of rotary movement which moves the locking pin from its locking position into the starting position of the arrangement to permit release of the connecting device according to the invention, after just a few degrees of angle of the rotary movement about the longitudinal axis of the locking pin, the pressure contact surfaces of the locking head are lifted off the support portion, and the locking pin is again axially guided by the guide surfaces of the housing which come into contact with the running surfaces of the locking pin.

In a preferred feature of the connecting device according to the invention the pressure contact surfaces of the locking head also serve, at the same time, as the running surfaces which bear against the guide surfaces of the housing, during the major part of the rotary movement. To avoid major abrasion wear phenomena here, the parts of the housing on which the guide surfaces are provided are also made from a material which can carry a heavy loading, for example also high-quality steel.

Further objects, advantages and features of the invention will be apparent from the following description of a preferred embodiment.

DESCRIPTION OF THE PREFERRED EMBODIMENT

Figure 1:
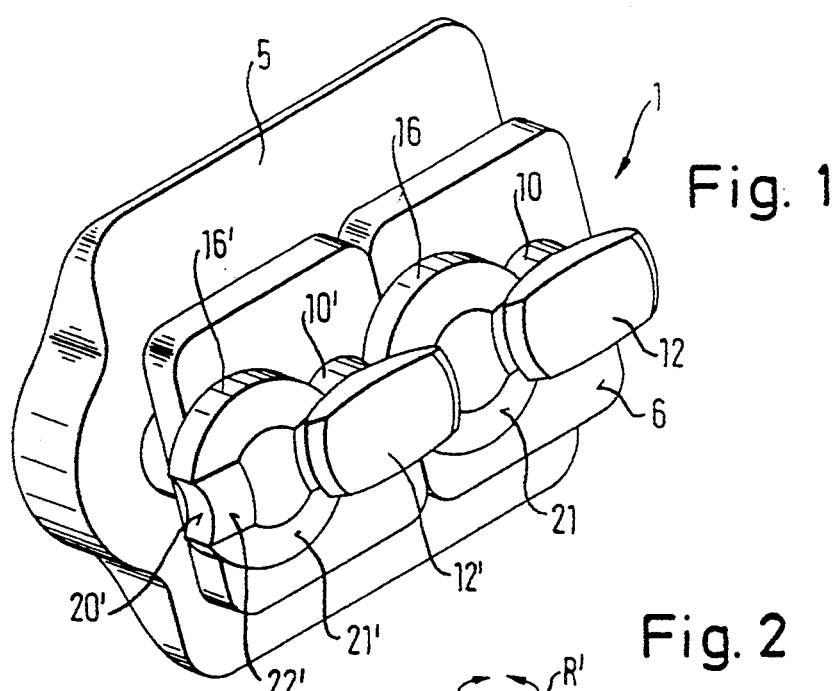
FIG. 1 is a perspective view of a connecting device according to the invention, looking onto locking heads of locking pins.
Figure 2:
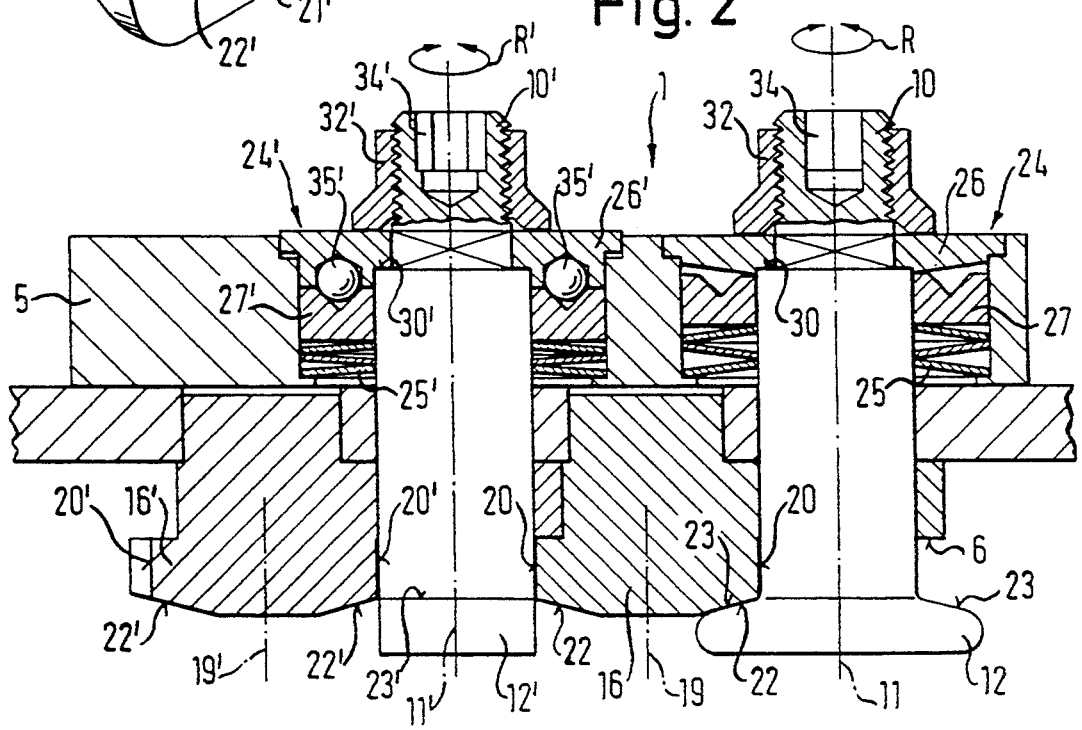
FIG. 2 is a view in section taken along the longitudinal central plane of the connecting device shown in FIG. 1.

Referring to FIGS. 1 and 2, shown therein is an embodiment of a connecting device, according to the invention, which is generally identified by reference numeral 1 and which can be used for example for releasably connecting and securely locking a lock member, serving for anchoring a freight container, to a holding means such as a support bar or rail which is let into the floor of an aircraft freight compartment.

Figure 3:
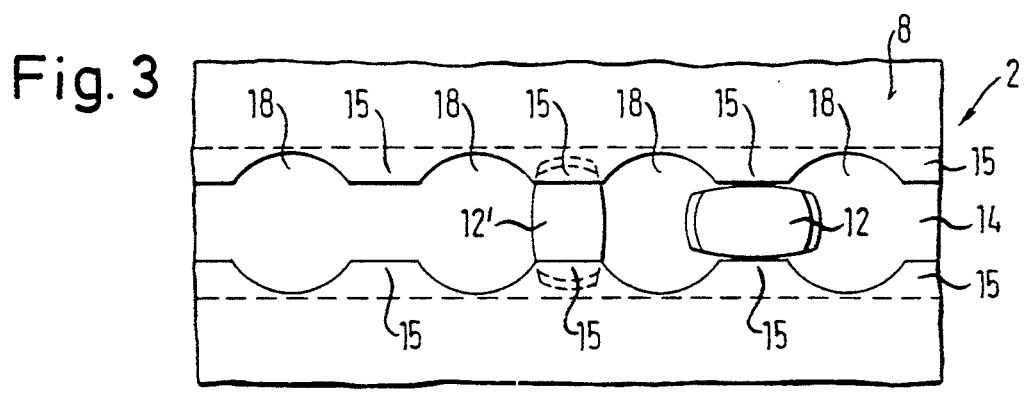
FIG. 3 is a plan view of a part of a support bar or rail to which the connecting device in FIGS. 1 and 2 can be releasably connected and locked.
Figure 4:
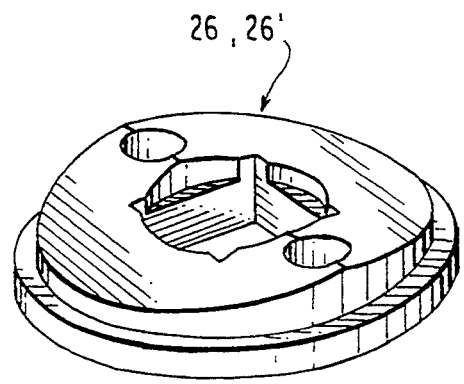
FIGS. 4 and 5 are perspective views of the upper and lower cam disks, respectively, shown in section in FIG. 3.
Figure 5:
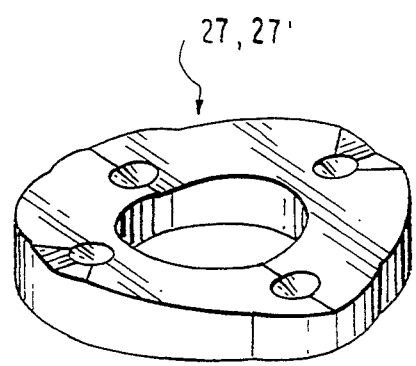

The connecting device 1 includes a housing 5, at one side of which, being the underside in the position of use thereof, there is a mounting surface 6 which, in the locking condition, lies on or bears against the top side of the support rail or bar indicated at 2 in FIG. 3, that top side serving as a support surface 8. Two locking pins 10 and 10' are mounted in the housing 5 in such a way that they are rotatable about their longitudinal axes 11 and 11' in the directions indicated by the double-headed arrows R and R' in FIG. 2. In addition, the locking pins can perform a very small stroke movement in their longitudinal direction, as will be further described in greater detail hereinafter.

The locking pins 10 and 10' extend with their longitudinal axes 11 and 11' approximately perpendicularly to the mounting surface 6 and project downwardly beyond that surface in for example FIG. 2, that is to say, in the connecting condition, the locking pins project towards the support bar 2 which receives them. At their ends which are the lower ends in FIG. 2, the locking pins 10 and 10' each have a respective locking head 12 and 12' which is substantially in the form of a plate-like body which extends perpendicularly to the longitudinal axes 11 and 11' respectively and the width of which is approximately equal to the diameter of the locking pins 10 and 10' while the length of the locking head is somewhat less than double the width.

That radially asymmetrical configuration of the locking heads 12 and 12' makes it possible for the locking pins 10 and 10' firstly to be moved into a starting position as shown in FIG. 1, in which the longitudinal axes of their locking heads 12 and 12' are so aligned with each other that the locking heads 12 and 12' can be introduced into the receiving opening 14 in the support surface 8, between projecting edge regions 15 thereof. That starting position is shown in each of FIGS. 2 and 3 in respect of the locking pin 10 at the right in each of those Figures, FIG. 3 showing only the right-hand locking head 12 for the sake of clarity of the drawing.

The above-described operation of introducing the locking heads 12 and 12' into the receiving opening 14 is facilitated by two locating pin portions 16 and 16' which project downwardly beyond the mounting surface 6 in the same direction as the locking pins 10 and 10' but to a lesser distance than same. Each of the locating pin portions 16 and 16' is of a substantially circular-cylindrical configuration and is of such an outside diameter that it can be introduced with a press or snug fit into one of the round enlargement portions 18 of the receiving opening 14.

In the locking condition the locating pin portions 16 and 16' fix the connecting device 1 with respect to the support bar 2 in all directions which are perpendicular to the longitudinal direction of the locking pins 10 and 10', that longitudinal direction being identified as the Z-direction. The locating pin portions 16 and 16' are therefore also identified as XY-locating pin portions.

The longitudinal axes as indicated at 19 and 19' in FIG. 2 of the locating pin portions 16 and 16' are disposed in the same plane as the longitudinal axes 11 and 11' of the locking pins 10 and 10' and are arranged in alternate relationship therewith and at spacings which are somewhat smaller than the sum of the radii of a locating pin portion 16, 16' and of a locking pin 10, 10' respectively. As in that region each locking pin is of a circular cross-section throughout, each of the locating pin portions 16 and 16' is provided at two diametrally oppositely disposed sides of its circular-cylindrical peripheral surface with two part-circular recesses 20 and 20' which provide the free space required for the respectively adjacent locking pin 10, 10'.

The lower ends of the locating pin portions 16 and 16' are of a frustoconical configuration, the conical surfaces 21 and 21' thereof rising at an acute angle of for example 14° relative to the plane perpendicular to the longitudinal axes 19 and 19', towards the middle of the respective locating pin portion 16 and 16'.

A respective guide surface 22 and 22' is incorporated into each of the above-mentioned conical surfaces 21 and 21' at two diametrally oppositely disposed sides, immediately adjoining the recesses 20 and 20'. The top side 23 and 23' of the respective adjacent locking head 12 and 12' bears against the respective guide surface 22 and 22' in the starting position of the connecting device and during the major part of a rotary movement which is described in greater detail hereinafter and which moves the connecting device from that starting position into the locking position.

The above-mentioned top sides 23 and 23' of the locking heads 12 and 12' also extend at an acute angle of for example 14° relative to the plane perpendicular to the longitudinal axes 11 and 11', rising towards the middle of the respective locking pin 10 and 10' respectively. That angle does not necessarily have to be the same as the above-mentioned angle of the conical surfaces 21 and 21'. The only important consideration in this respect is that the guide surfaces 22 and 22' are of such a shape and position as if they were produced by a milling cutter rotating about the respective longitudinal axes 11 and 11', if such a milling cutter were fitted into the housing 5 in place of the respective locking pins 10 and 10' and had cutting edges of a configuration corresponding to the top sides 23 and 23' of the locking heads 12 and 12' respectively.

That configuration of the guide surfaces 22 and 22' ensures that the locking pins 10 and 10', in their starting position, occupy a position in which they are advanced downwardly to the maximum extent and out of which they move slightly but continuously upwardly (as viewed in FIG. 2), during the above-mentioned rotary movement which leads to the locking position of the connecting device.

That rotary movement is effected after the connecting device 1 has been fitted onto the support bar 2, and goes from the starting position, shown in FIG. 1 through 90° until the locking heads 12 and 12' have reached the locking position which is shown in each of FIGS. 2 and 3 in respect of the respective left-hand locking pin 10' and in which the respective locking heads engage under the edge regions 15 which project towards the longitudinal center line of the receiving opening 14.

In the locking position the locking heads 12 and 12' are pressed with their top sides 23 and 23' against the undersides of the edge regions 15 of the receiving opening 14, said edge regions serving therefore as support portions for the locking heads, with the locking heads being pressed against the support portions by means of a stressing arrangement, as generally indicated at 24 and 24', which will be described in greater detail hereinafter.

It should be expressly noted here that the top sides 23 and 23' of the locking heads 12 and 12' in the particularly preferred embodiment described herein perform a dual function. Thus, in the starting position and during the major pert of the rotary movement during which they bear against the guide surfaces 22 and 22', the top sides 23 and 23' of the locking heads 12 and 12' serve as contact or running surfaces for the locking pins 10 and 10', while in the locking position they serve as pressure contact surfaces which transmit to the support bar 2 the forces which act in the axial direction. In accordance with the invention, however, those two functions can also be performed by surfaces which are completely separate from each other on the respective locking pin 10 and 10'.

The stressing arrangements 24 and 24' each include a set or pack of plate springs 25 and 25' and two cam disks 26, 27 and 26', 27' respectively. Each of the cam disks 26, 27 and 26', 27' has a central opening therethrough, through which the associated locking pin 10 and 10' extends.

The central opening in the upper cam disk 26, 26' is, for example, of a square configuration, to provide a non-rotatable connection between the respective upper cam disk and the associated locking pin 10 and 10', and is carried with a press or snug fit on a portion of corresponding cross-section of the associated locking pin 10 and 10'.

In addition the first or upper cam disk 26 and 26' lies on a radially projecting shoulder 30 and 30' of its respectively associated locking pin 10 and 10' and is pressed against that shoulder by a nut 32 and 32' screwed onto the end of the locking pin 10 and 10', and which is opposite the respective locking head 12 and 12'. In that way the cam disk 26 and 26' is connected to its locking pin 10 and 10' both non-rotatably and also immovably in the axial direction.

On the other hand the second or lower cam disk 27 and 27' has a round central through opening through which the respective locking pin 10 and 10' extends in such a way that it can rotate freely relative to the second cam disk 27 and 27' which in turn is connected to the housing 5 non-rotatably, but displaceably in the axial direction. The locking pin 10 and 10' and the associated second cam disk 27 and 27' are also movable freely relative to each other in the axial direction.

To receive the stressing arrangements 25 and 25', the housing 5 has respective recesses or openings which extend into the housing 5 from the top side thereof, that is to say the side which is in opposite relationship to the locking heads 12 and 12'. The recess or opening concentrically surrounds the associated locking pin 10, 10'. The set of plate springs 25 and 25' is so arranged in the respective recess or opening in the housing 5 that the set of springs also concentrically surrounds the respective locking pin 10 and 10' and bears against the housing 5 at the bottom of the recess or opening therein. The respective second cam disk 27 and 27' bears with its flat underneath face against the top side of the plate springs 25 and 25'. The opposite face of the cam disk 27 and 27' which is thus towards the first cam disk 26, 26' is of a V-shaped concave configuration along two mutually perpendicular diameters, the one apex line of the V-shaped concave configurations extending substantially deeper in the axial direction into the second cam disk 27, 27', than the other apex line.

The underneath face of the first cam disk 26, 26', which is opposite the upwardly facing face of the second cam disk 27, 27' is of a V-shaped convex configuration along a diameter.

That arrangement thus provides two accurately defined positions which are turned through 90° relative to each other. In one of those positions, namely the starting position of the respective locking pin 10 and 10', the apex, which projects in a V-shape, of the first cam disk 26, 26', engages into the deeper of the two V-shaped recesses or concave configurations of the second cam disk 27, 27' respectively, so that the total axial thickness of the two cam disks 26, 27 and 26', 27' respectively is of a minimum value. In the other of the two positions, namely the locking position, the V-shaped projecting apex of the first cam disk 26, 26' engages into the shallower of the two V-shaped recesses in the second cam disk 27, 27', thus giving a substantially increased axial thickness for the two cam disks 26, 27 and 26', 27' respectively.

The above-described starting position is shown in FIG. 2 in respect of the right-hand locking pin 10 while the locking pin 10' which is at the left in FIG. 2 is in the locking position in which, because of the axial increase in thickness of the cam disks 26', 27', the plate springs 25' are compressed to a substantially greater degree and thus urge the locking pin 10' upwardly with a high force by way of the second cam disk 27' and the first cam disk 26' which is fixedly connected to the locking pin.

It will be noted float the locking pin 10' can move under that force only to a slight degree as the undersides, which serve as the support portion, of the edge regions 15 of the receiving opening 14 in the support bar 2 are only slightly 'higher' in the axial direction than the regions of the guide surfaces 22, 22' which control the axial movement of the locking pins 10 and 10', until just before the termination of the rotary movement. It is only over the last degrees of angle of the rotary movement, which leads into the locking position, that the top sides 23 and 23' of the locking heads 12 and 12' come completely free from those guide surfaces 22, 22' so that they are pressed fully against the undersides of the edge regions 15 by the force of the plate springs 25, 25' which hitherto were already continuously prestressed. The axial stroke movement performed by the respective locking pin 10 and 10' during that pressing procedure is some hundredths of a millimeter, and is indicated at the left-hand side of FIG. 1 by the top side of the first cam disk 26' which moves with the locking pin 10' and which in the starting position is aligned with the top side of the housing 5 being lifted somewhat above that surface. The step which is formed as a result is shown on a greatly enlarged scale in FIG. 2 for the sake of clarity, but it would be practically indiscernible with the naked eye in an actual construction. It is sufficient if the difference in height, corresponding to that stroke movement, as between the guide surfaces 22, 22' and the underside of the edge regions 15, is just of such a magnitude that the top sides 23, 23' of the locking heads 12, 12' bear exclusively against the guide surfaces 22, 22' and do not contact the undersides of the edge regions 15, during the rotary movement for moving the locking heads between the starting position and the locking position, with the exception of the degrees of angle which immediately adjoin attainment of the locking position and departure from the locking position respectively.

That gives the great advantage that no serious abrasion wear occurs at the underneath surfaces of the edge regions 15 of the support bar 2 which for reasons of weight is made from aluminium. The locating pin portions 16 and 16', like the locking pins 10 and 10', can be made from a material which has a substantially higher level of resistance to wear, for example high-quality steel, without that having a serious effect on the weight of the overall arrangement.

By virtue of the design configuration according to the invention, far above 90% of the friction phenomena which occur with the described rotary movements of the locking pins 10 and 10' take place between the surfaces 22, 22' and 23, 23' which are of a specific wear-resistant configuration in the above-described manner, and the support bars 2 which are fixedly installed in the aircraft suffer from minimum wear loadings.

The above-described rotary movements are produced by means of a tool which is not shown in the drawings and which is in the form of a socket head screwdriver and which is fitted with its tip into hexagonal recesses 34 and 34' provided in the end faces of the locking pins 10 and 10', which are remote from the locking heads 12 and 12'.

As can be seen from the left-hand side of FIG. 2, provided in the underside of the first cam disk 26 and 26' are two recesses which are disposed on the line of the apex of the projecting V-shape configuration and which each accommodate a respective detent ball 35, 35' which projects somewhat beyond the downward face of the cam disk 26, 26'.

Disposed on the top side of the second cam disk 27, 27' are four small recesses which are disposed in opposite relationship in pairs and which are arranged on the apex lines of the V-shaped depressions in the cam disk and into which the detent balls 35 and 35' can engage in the starting position and in the locking position. That detent arrangement makes it easier to find the two positions referred to, and prevents the locking pins 10 and 10' from being able to move out of those positions, even when subjected to severe shaking or jolting loadings.

In the starting position the first cam disk 26, 26', which is rigidly connected to the locking pin 10 and 10', lies with its peripheral edge on a shoulder of the housing 5. In the locking position it lifts only slightly off that shoulder, by virtue of the small axial stroke movement performed by the locking pin 10, 10'. That gives the advantage that forces, which occur in flight and act downwardly in FIG. 2 in the longitudinal direction of the locking pins 10 and 10', only slightly compress the plate springs 25 and 25' and are then directly transmitted to the housing 5 by way of the first cam disk 26, 26' and are transmitted from the housing 5 to the support bar 2. The other parts of the stressing arrangements 24 and 24', in particular the second cam disks 27, 27' and the plate springs 25 and 25', therefore only have to carry a fraction of those forces.

As can be seen in particular from FIG. 3, the longitudinal side edges of the locking heads 12 and 12' are in the form of circular arcs of very large radius. That considerably facilitates both the introduction of the locking heads 12 and 12' into the receiving opening 14 and also removal thereof from the receiving opening when the connecting device is released. More specifically, the locking heads 12 and 12' can be turned through a few degrees of angle relative to the ideal position shown in respect of the locking head 12 which is at the right in FIG. 3, without becoming jammed against the projecting edge regions 15 in the course of being introduced into or removed from the receiving opening 14.

As indicated above, although the above-described connecting device may preferably be used in relation to connecting and locking a freight component such as a container to a support rail or bar which is fixedly installed in an aircraft, the device can also be used in any other situation where first and second bodies are to be connected and locked together in a similar fashion, with one of the two bodies being fixedly connected to the housing of the connecting device at least during the period of use and the other body having a holding means, corresponding to the above-described support bar 2, with a receiving opening in which the locking head of the locking pin can be introduced in the starting position of the connecting device so that, in the locking position, the locking head can bear against the edge regions of the receiving opening in a direction which is generally opposite the direction of introduction, after the locking head has been turned through a predetermined angle of for example 90°.

It will be appreciated that the above-described embodiment has been set forth solely by way of example and illustration of the principles of the present invention and that further modifications may be made therein without thereby departing from the spirit and scope of the invention.

What is claimed is:

1. A connecting device for quick and releasable connection and locking of a first body to a second body, comprising:
   a housing which is connected to one of the bodies, and which, in a connecting position of the device, bears against a holding means of the second body, the holding means having a receiving opening with an edge region, the housing providing a guide surface;
   at least one locking pin which has a locking head providing a pressure contact surface, and which is mounted in the housing rotatably about a longitudinal axis of said pin such that said pin is rotatably reciprocatable between a starting position, in which the locking head can be introduced into the receiving opening in said holding means and is movable out of said receiving opening, and a locking position in which the locking head engages behind the edge region of the receiving opening, the locking pin having a running surface engageable with the guide surface of the housing; and
   a stressing means including a spring, and operable to move the locking pin out of an axially advanced position, which is along said longitudinal axis in a first direction and which the locking pin assumes in the starting position of the device, and into an axially retracted position which is spaced from said advanced position in a direction opposite to said first direction, and in which the pressure contact surface of the locking head is pressed into the locking position by the stressed spring against a support portion of the holding means, whereby said support portion within the receiving opening adjoins the edge region behind which the locking head is engageable, so that the running surface of the locking pin is pressed against the guide surface of the housing during a rotary movement of the locking pin from said starting position into said locking position with increasing stressing of the spring without the pressure contact surface of the locking head coming into contact with said support portion, and so that it is only in a last part of said rotary movement that said running surface comes free from said guide surface whereby the force of said stressed spring presses said pressure contact surface against said support portion.

2. A connecting device as set forth in claim 1 wherein said running surface of the locking pin is formed by said pressure contact surface of the locking head.

3. A connecting device as set forth in claim 1 wherein said stressing means includes first and second cam disks, the cam disks having mutually facing faces forming cam faces, each of which disks has a central opening through which the locking pin extends, wherein the locking pin is fixedly connected to the first cam disk and is freely movable relative to the second cam disk both axially and in relation to rotary movement about its longitudinal axis, and wherein the second cam disk is non-rotatably but axially movably mounted relative to the housing and can be pressed by the spring which is supported against the housing with its cam face against the cam face of the first cam disk.

4. A connecting device as set forth in claim 3 wherein the cam faces which bear against each other of the cam disks are of such a configuration that upon a rotary movement of the locking pin through 90° out of said starting position into said locking position the second cam disk is moved in the axial direction so that said spring is more heavily stressed.

5. A connecting device as set forth in claim 4 including at least one detent ball fitted into a said cam disk and projecting beyond the cam face thereof, and detent recess means in the cam face of the other said cam disk such that the at least one said detent ball engages into said recess means in the starting position and in the locking position, thereby precisely defining the respective positions.

6. A connecting device as set forth in claim 1 wherein the axially advanced position of the locking pin is limited by an abutment means on the housing.

7. A connecting device as set forth in claim 6 wherein the abutment means on the housing is formed by a shoulder thereon.

8. A connecting device as set forth in claim 1 wherein the spring is formed by a plurality of plate springs disposed concentrically around the locking pin.

9. A connecting device as set forth in claim 1 including at least one locating pin portion immovably fixed on the housing, the longitudinal, axis of the locating pin portion extending substantially parallel to the longitudinal axis of the locking pin and the locating pin portion upon insertion of the locking pin into the associated receiving opening being adapted to be introduced into a locating opening in the holding means into which it fits in such a way that it is operative to prevent displacement of the first body relative to the second body in directions perpendicular to the longitudinal axis of the locking pin.

10. A connecting device as set forth in claim 9 wherein the guide surface of the housing is provided at a free end of the locating pin portion.

* * * * *